US011611773B2

(12) United States Patent
Al-maadeed et al.

(10) Patent No.: US 11,611,773 B2
(45) Date of Patent: Mar. 21, 2023

(54) SYSTEM OF VIDEO STEGANALYSIS AND A METHOD FOR THE DETECTION OF COVERT COMMUNICATIONS

(71) Applicants: Qatar University, Doha (QA); Qatar Foundation for Education, Science and Community Development, Doha (QA)

(72) Inventors: Somaya Al-maadeed, Doha (QA); Ahmed Bouridane, Newcastle upon Tyne (GB); Noor Al Maadeed, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 39 days.

(21) Appl. No.: 16/376,690

(22) Filed: Apr. 5, 2019

(65) Prior Publication Data
US 2019/0313114 A1 Oct. 10, 2019

Related U.S. Application Data

(60) Provisional application No. 62/653,816, filed on Apr. 6, 2018.

(51) Int. Cl.
*H04N 19/513* (2014.01)
*G06N 20/10* (2019.01)
*H04N 19/467* (2014.01)
*H04N 19/139* (2014.01)

(52) U.S. Cl.
CPC .......... *H04N 19/513* (2014.11); *G06N 20/10* (2019.01); *H04N 19/139* (2014.11); *H04N 19/467* (2014.11)

(58) Field of Classification Search
CPC ...... G06K 9/6269; G06N 20/10; G06N 7/005; H04N 19/139; H04N 19/467; H04N 19/513
See application file for complete search history.

(56) References Cited

U.S. PATENT DOCUMENTS

| 6,157,396 | A | * | 12/2000 | Margulis | ................. G06T 1/20 345/506 |
| 7,885,336 | B2 | * | 2/2011 | Wong | ..................... H04N 19/44 375/240.25 |
| 9,628,817 | B2 | * | 4/2017 | Rossato | ............... H04N 19/187 |
| 10,169,843 | B1 | * | 1/2019 | Amer | ..................... G06T 5/005 |

(Continued)

FOREIGN PATENT DOCUMENTS

| CN | 104301733 A | * | 1/2015 | ......... H04N 21/8358 |
| CN | 108683921 A | * | 10/2018 | ........... H04N 19/122 |

(Continued)

*Primary Examiner* — Reza Aghevli
(74) *Attorney, Agent, or Firm* — K&L Gates LLP

(57) ABSTRACT

A system of video steganalyzer is provided. The system includes a display and a processor. The processor is configured to generate a motion vector map from a video, extract a morphological feature from the motion vector map, evaluate the morphological feature of the motion vector map, and determine if the video includes embedded information.

9 Claims, 15 Drawing Sheets

(56) References Cited

U.S. PATENT DOCUMENTS

| | | | | |
|---|---|---|---|---|
| 2003/0035592 A1* | 2/2003 | Cornog | ................... | G06T 13/80 345/646 |
| 2004/0101056 A1* | 5/2004 | Wong | ..................... | H04N 19/42 375/E7.199 |
| 2008/0310513 A1* | 12/2008 | Ma | ....................... | H04N 19/109 375/E7.123 |
| 2009/0086821 A1* | 4/2009 | Ohira | .................... | H04N 19/14 375/E7.125 |
| 2009/0167778 A1* | 7/2009 | Wei | ......................... | G09G 5/14 348/E5.062 |
| 2009/0213933 A1* | 8/2009 | Zuo | ...................... | H04N 19/139 375/E7.193 |
| 2010/0104021 A1* | 4/2010 | Schmit | ................. | H04N 19/176 375/E7.026 |
| 2010/0259676 A1* | 10/2010 | Swan | ................. | H04N 21/4884 348/468 |
| 2011/0116726 A1* | 5/2011 | Hosaka | ................... | G06T 5/003 382/255 |
| 2011/0193941 A1* | 8/2011 | Inaba | ..................... | G03B 37/02 348/46 |
| 2012/0219229 A1* | 8/2012 | Springer | .................. | G06T 5/50 382/199 |
| 2012/0224759 A1* | 9/2012 | Masui | ................. | A61B 8/5269 382/131 |
| 2013/0072299 A1* | 3/2013 | Lee | ...................... | H04N 19/513 463/32 |
| 2013/0308005 A1* | 11/2013 | Takahashi | ................. | G06T 7/30 348/222.1 |
| 2014/0028880 A1* | 1/2014 | Kawaguchi | ............. | G06T 5/002 348/241 |
| 2015/0350678 A1* | 12/2015 | Shimizu | ............... | H04N 13/128 375/240.16 |
| 2016/0073111 A1* | 3/2016 | Lee | ...................... | H04N 19/124 375/240.03 |
| 2016/0198159 A1* | 7/2016 | Rossato | ................. | H04N 19/46 375/240.16 |
| 2016/0224864 A1* | 8/2016 | Chang | .................... | G06V 10/44 |
| 2017/0070745 A1* | 3/2017 | Lee | ...................... | H04N 19/147 |
| 2018/0189461 A1* | 7/2018 | Ghafourifar | ......... | H04N 21/631 |
| 2018/0349400 A1* | 12/2018 | Boutnaru | .............. | H04L 63/123 |
| 2019/0005633 A1* | 1/2019 | Nagashima | ........ | H04N 5/23267 |
| 2019/0163944 A1* | 5/2019 | Lau | ....................... | G06K 19/14 |
| 2019/0222672 A1* | 7/2019 | Greenberg | ............. | H04L 67/02 |
| 2019/0259126 A1* | 8/2019 | Lancioni | ............... | G06V 10/454 |
| 2019/0297298 A1* | 9/2019 | Arpa | ...................... | H04N 5/913 |
| 2019/0356476 A1* | 11/2019 | Zheng | ..................... | H04K 1/02 |
| 2020/0184592 A1* | 6/2020 | Baluja | .................. | G06T 1/0021 |

FOREIGN PATENT DOCUMENTS

| | | | | |
|---|---|---|---|---|
| CN | 108683921 A | * | 6/2020 | ........... H04N 19/122 |
| CN | 111263157 A | * | 6/2020 | ............... G06K 9/62 |
| WO | WO-2013068825 A1 | * | 5/2013 | ........... H04N 19/136 |
| WO | WO-2014198021 A1 | * | 12/2014 | ........... G06T 1/0085 |
| WO | WO-2016201648 A1 | * | 12/2016 | ............... G06K 9/62 |

\* cited by examiner

SYSTEM OF VIDEO STEGANALYSIS AND A METHOD FOR THE DETECTION OF COVERT COMMUNICATIONS

CROSS REFERENCE TO RELATED APPLICATIONS

The present application claims the benefit of U.S. Provisional Application No. 62/653,816, filed on Apr. 6, 2018, the disclosure of which is incorporated into this specification by reference in its entirety.

BACKGROUND

In contrast of cryptography, which aims is to avoid an outsider to access/read the information, steganography is the science and the art of covert communications. The objective of steganography is to transmit secret messages and communications without drawing any suspicion. Fundamentally, stenographic goal is not to prevent outsider from decoding the hidden message, but to prevent them from suspecting the existence of the secret message or communication. In modern steganography, any digital objects, such as images, sounds, text document or video can be used as a message carrier. Thanks to the recent advances communications, Internet and social media technology, steganography has become a large field of research and development. In addition, some steganalysis methods have been developed to detect embedded messages on images. Nevertheless, video steganalysis methods are still undeveloped.

SUMMARY

The present disclosure generally relates to a system of video steganalysis and a method of using the same for detecting covert communications.

In light of the present disclosure, and without limiting the scope of the disclosure in any way, in an aspect of the present disclosure, which may be combined with any other aspect listed herein unless specified otherwise, a system is provided. The system includes a display and a processor. The processor is configured to generate a motion vector map from a video, extract a morphological feature from the motion vector map, evaluate the morphological feature of the motion vector map, and determine if the video includes embedded information.

In an aspect of the present disclosure, which may be combined with any other aspect listed herein unless specified otherwise, the system further includes a memory, wherein the memory is configured to store data of the video.

In an aspect of the present disclosure, which may be combined with any other aspect listed herein unless specified otherwise, the display is configured to output an indication of the embedded information.

In an aspect of the present disclosure, which may be combined with any other aspect listed herein unless specified otherwise, the embedded information is hidden in the video.

In an aspect of the present disclosure, which may be combined with any other aspect listed herein unless specified otherwise, the processor is configured to perform classification via a support vector machine algorithm.

In an aspect of the present disclosure, which may be combined with any other aspect listed herein unless specified otherwise, the video is in a compressed format.

In an aspect of the present disclosure, which may be combined with any other aspect listed herein unless specified otherwise, the morphological feature includes one or more of a number of isolated macro blocks, second order statistics and a number of homogeneous areas per frame.

In an aspect of the present disclosure, which may be combined with any other aspect listed herein unless specified otherwise, a method is provided. The method includes generating a motion vector map from a video, extracting a morphological feature from the motion vector map, evaluating the morphological feature of the motion vector map, and determining if the video includes embedded information.

One of the technical effects according to an embodiment of the present disclosure is that it provides an improved reliable method for analyzing video data, and that it is significantly computationally efficient compared to the conventional methods. Another technical advantage is that it provides a system that need less manual expert interaction and training prior to use of this system. The embodiments of the present disclosure enable a computationally more efficient, and therefore quicker, process for establishing whether a video contents hidden data. The system according to an embodiment may also perform at a higher success rate and higher efficiency than earlier equivalent systems. It should be noted that the effects described herein are not necessarily to be considered limited, and other suitable properties relating to the present technology may be realized and as further described.

BRIEF DESCRIPTION OF THE DRAWING

Features and advantages of the present disclosure including a system of video steganalysis and a method of using the system described herein may be better understood by reference to the accompanying drawings in which.

The reader will appreciate the foregoing details, as well as others, upon considering the following detailed description of certain non-limiting embodiments including the system of video steganalysis and the method of using the system according to the present disclosure.

DETAILED DESCRIPTION

Natural video data is generally modelled as a background, subjected to simple transformations such as translations, rotations, affine transformations caused by a shift or a zoom of the camera, and independent moving of objects subject to the same types of transformations. This includes high correlation between the adjacent pixels in space and/or time domains. This correlation is used to compress the video file, modelling the frames as a grid of 16×16 pixels macro-blocks (MB) subjected to translation transformations. The compressed information is only a sample of the entire frames, including, for example, motion vectors (MV) maps which contain the information of the MBs translations and residual frames to complete the loss of information. Even with this compression method, spatial and temporal correlations still exist. In this disclosure, spatial correlation of the MV map is used.

The MV map may be seen as images with continuous areas for the background and the moving objects. In the MPEG-4 and H.264 standards, the MVs are estimated with half pixel and a quarter pixel precision/resolution. This natural sampling introduces homogeneous areas (FIGS. 1A and 1B).

Figure 1A:
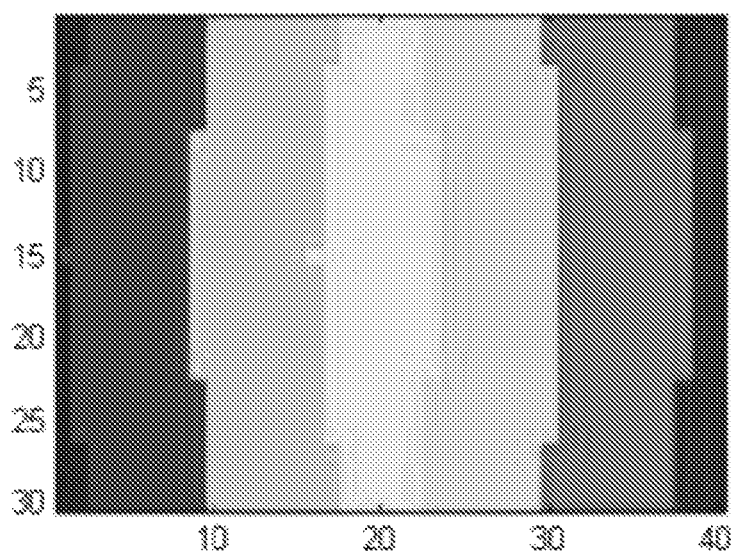
FIG. 1A includes a graph of vertical component of an MV map with sampling.
Figure 1B:
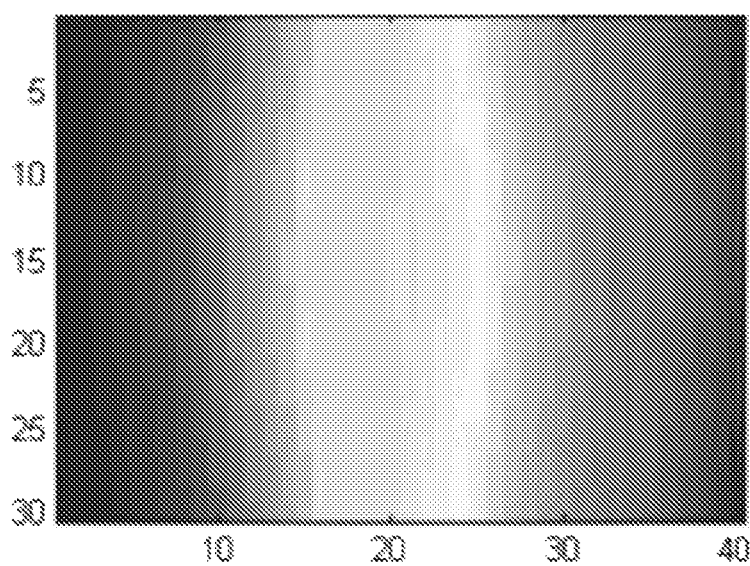
FIG. 1B includes a graph of vertical component of an MV map without sampling.
Figure 2A:
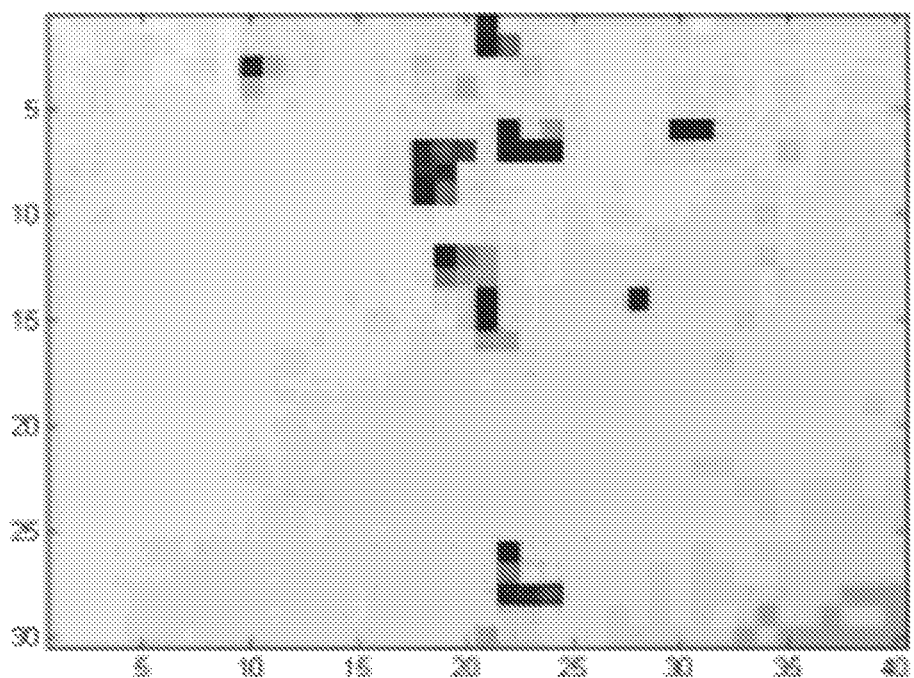
FIG. 2A includes a graph of horizontal component of an MV map with sampling.
Figure 2B:
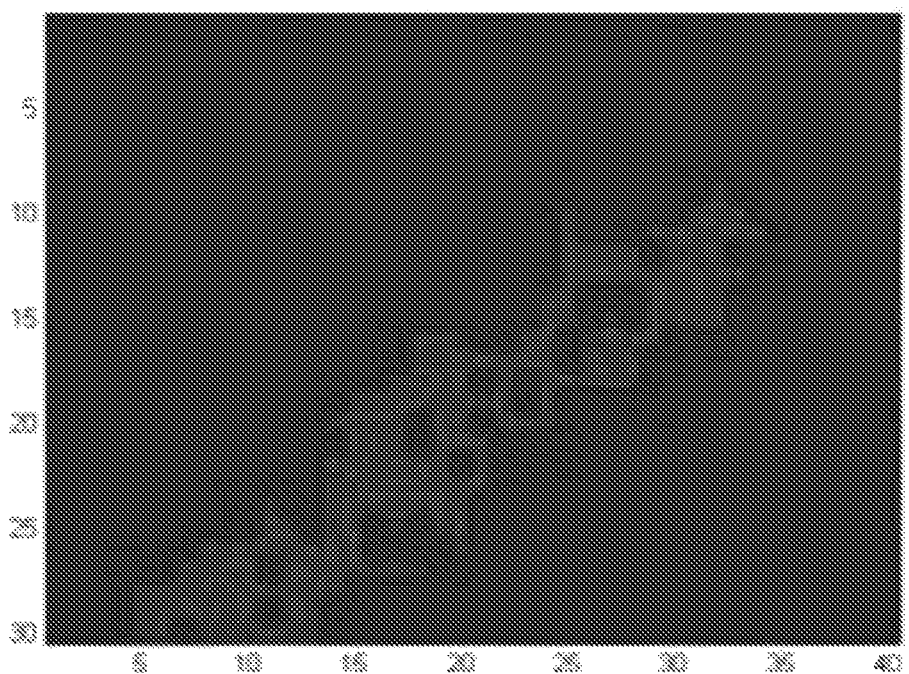
FIG. 2B includes a graph of an extracted area of horizontal component of an MV map.

In FIGS. 1A and 1B, the motion introduces 7 different areas. An area is defined by a similar value, referred to as MV component, and a spatial continuity regarding to the 4 neighbours. FIGS. 2A and 2B show a real MV map and one extracted area.

The majority of the steganographic schemes are based on the Least Significant Bit (LSB). It consists of defining a rule to choose the MV carriers, and introduce information in it by adding a noise corresponding to the information bit. These techniques are modelled as an independent noise added to the vertical and horizontal components of the motion vectors.

$$X_i S_i + n_i \quad (1)$$

where $S_i$ and $X_i$ are the original and stega component of the MV corresponding to the ith MB, and n, is the added steganographic noise. For the LSB method 2 f w; 0; wg which w is the range of value, here 0.5 or 0.25. The random variable are independent and identically distributed and follow the probability mass function (2):

$$p(b=0)=1p/2$$

$$p(n=-w)=1-p/4$$

$$p(n=w)=1-p/4 \quad (2)$$

where p is the embedding rate, varying between 0 (e.g., the video has not been modified) and 1 (e.g., the MVs are carrying the message).

The modifications of the MV value are almost negligible, but the morphology of the MV map is subject to significant changes, even at low embedding rates. Except during the changes of scenes or chaotic scene like smoke or crowd, the MV map represent sampled continuous curve (FIGS. 1A and 1B & FIGS. 2A and 2B). Thus, the MV map is constituted of homogeneous areas. When a message is embedded these areas are modified. The steganalysis method is based on features extracted from these areas according to an embodiment.

According to an embodiment of the present technology, a method is based on the number of continuous areas per MV map, with the areas defined in section 2, and the number of isolated MVs with pre-set size of 1 MB including the 4 neighbours MV have closers values, this corresponds to a flat extremum. In contrast, a statistical steganalysis based on the values of the MV does not take in account the MV values but only the regularity of the MV map. If one of the MB is changed, the probability of adding isolated MB can be found as follows:

$$P(\text{addisolated}=1)=1-3Pb/4 \quad (3)$$

where Pb is the proportion of MV which have at least one neighboured MV with a difference of w. For non-chaotic scenes, Pb<<1.

At low embedding rates, if changes occur to isolated MBs, the average number of added sur-faces is:

$$<N>=(1-3Pb/4)n.Np \quad (4)$$

Where p is the embedding rate and Nb is the number of MB per frames.

Figure 3:
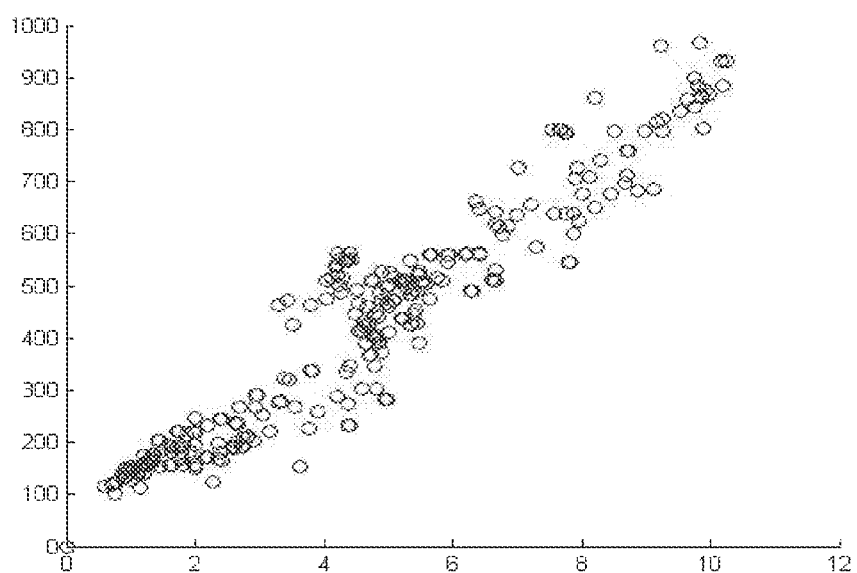
FIG. 3 includes a graph of number of areas in function of the standard deviation of the MV for 640×480 p video.

At high embedding rates, the average number of added surfaces is inferior to the one given by the formula, but the number of added surfaces still increases with an increase of p. This increase of isolated areas has a direct impact on the number of areas present in the MV map. For a given resolution of the video sequence, the number of areas can vary a lot, for example between 100 and 1000 for 640×480 p videos. But for natural videos, the number of areas per MV map is almost proportional to the standard deviation (FIG. 3). This affirmation was inferred by empirical data from 1059 N9M2 Groups of Pictures (GOP) extracted from numerous video with different resolutions.

Figure 4A:
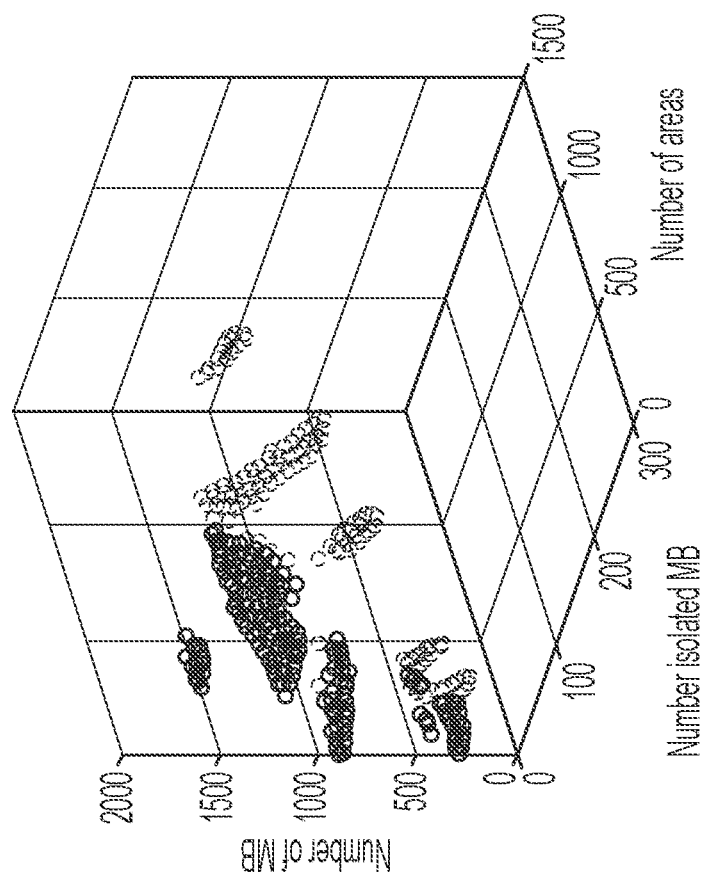
FIG. 4A and FIG. 4B includes scatterplots of the four defined feature for 2880 GOP extracted from 35 original (blue), and stega (red) videos with 100% embedding rate.
Figure 4B:
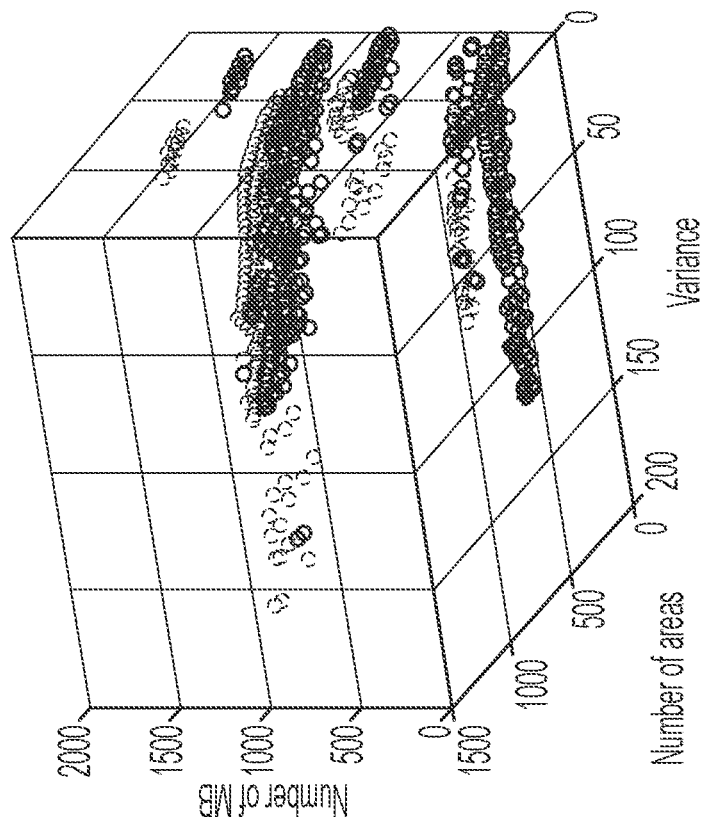
Figure 5A:
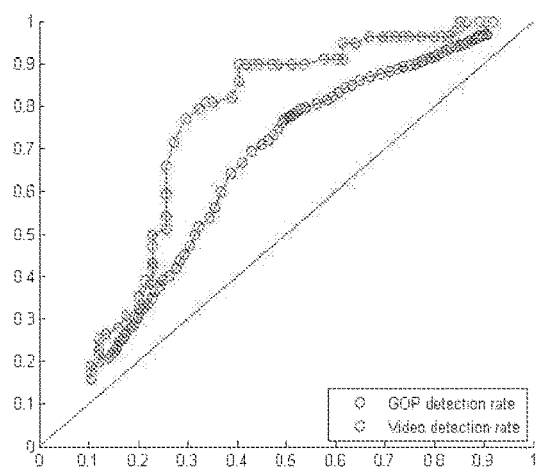
FIG. 5A includes ROC curves with 5% embedding rates.
Figure 5B:
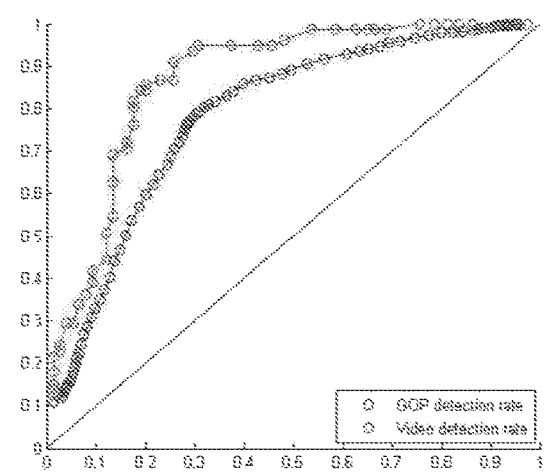
FIG. 5B includes ROC curves with 10% embedding rates.
Figure 5C:
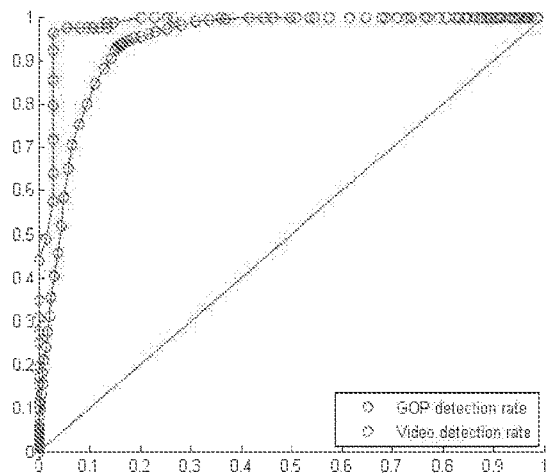
FIG. 5C includes ROC curves with 20% embedding rates.
Figure 5D:
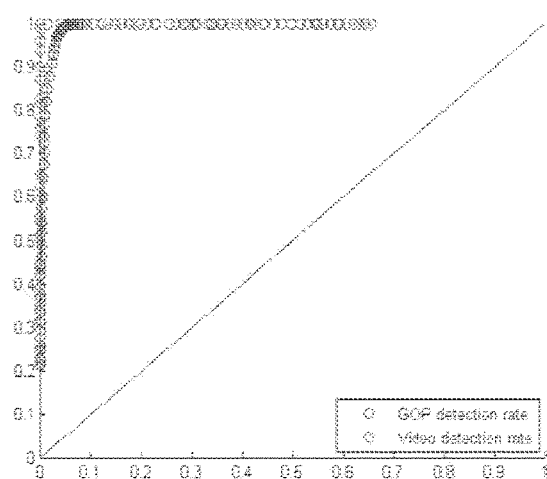
FIG. 5D includes ROC curves with 40% embedding rates.

The slope of this relation varies with the resolution of the video. In order to separate original videos from stega ones, the four used features are: 1. the number of isolated MBs, 2. the number of area per frames, 3. the variance of the MV per frames and 4. the number of MB per frames (FIG. 4). As videos have different scenes with different global motions, each video is separated in GOP. For each video, the decision is taken comparing the number of positive and negative detections for all the GOP of the video.

To separate the original videos and stegano-graphic videos, a Support Vector Machine (SVM) algorithm is used. This classifier of the SVM algorithm has a higher performance than the other common learning machine.

The kernel used is a quadratic one, which steers an optimisation problem in 18 dimensions space. The chosen optimisation method is a golden section search applied sequentially to the 18 coefficients. To avoid the convergence in a local optimum, a Gaussian noise, decreasing with the iterations is added to the parameters.

Testing and validation have been carried out using 1100 videos with duration of 10 to 100 seconds, containing a large set of scenes such as television coverage, home videos, and extracts from films. Some sequences with few motions, other with complex motions or scenes changes. These videos generated 38960 originals N9M2 GOP and the same number of steganographic ones. The results are summarized into Receiver Operating Characteristic (ROC) curves as shown in FIGS. 5A-5D. Each curve is the average of 11 intermediate ROC curves obtained with one training step with 1000 videos, and one testing step with the 100 remaining videos.

The videos used for the training were randomly chosen by Matlab to have representative sets of videos. Each video is used in only one test sample, and thus all the videos are tested once. The experiments for the different embedding rates are independents.

The method in an embodiment separates all the 110 original videos and 110 steganographic video for embedding rates higher than 40%. In other words, 20% of the MV are modified by 0.5 pixel. Even with 10% embedding rates, it can detect 85% of the steganographic videos with 20% of false positives.

The disclosure discloses a video steganalysis method which is against video steganography based on the modification of the motion vectors in the compressed video file. The method in an embodiment is based on the classification of feature extract from the morphology of the motion vector map. It has been tested on a large set of video each one during between 10 and 100 seconds with variable resolution and quality.

The disclosure also discloses a video steganalysis method based on the morphology of the motion vectors map. The features extracted from the morphology of the MV map do not directly depend on the value of the MV. Therefore, it can separate with a high trustworthiness the original videos and videos with steganographic information even with embedding rates under 20%. This method can also be adapted with a priority, like 0 MV does not carry information that can virtually increase the embedding rate and the performances. Morphology can be explored. 3D morphology features taking in account temporal correlation can be used to improve the performance of the method.

The present disclosure also discloses a system that automatically detects the mere presence of hidden messages in video communications in untrusted channels such as Internet. The system may include a computer, a display, and a database of digital videos with or without hidden messages, which are accessible by the computer. The computer may include a CPU (central processing unit), a RAM (Random Access Memory), a ROM (Read Only Memory), a processor, or the like. The system is configured to identify and estimate the amount of changes in the motion vectors of compressed video introduced by the process of hiding the embedded messages. This will allow law enforcement and cybercrime officers to examine and analyze multimedia exchanges on YouTube, Flickr, Facebook, etc. for a rapid identification of hidden messages and suspect communications. The system will allow them to spot criminal multimedia activities by examining the motion vectors extracted from compressed video automatically. The system is configured to use compressed digital multimedia data exchanged on Internet captured according to Standards MPEG-2, MPEG-4 and H.264.

Figure 6:
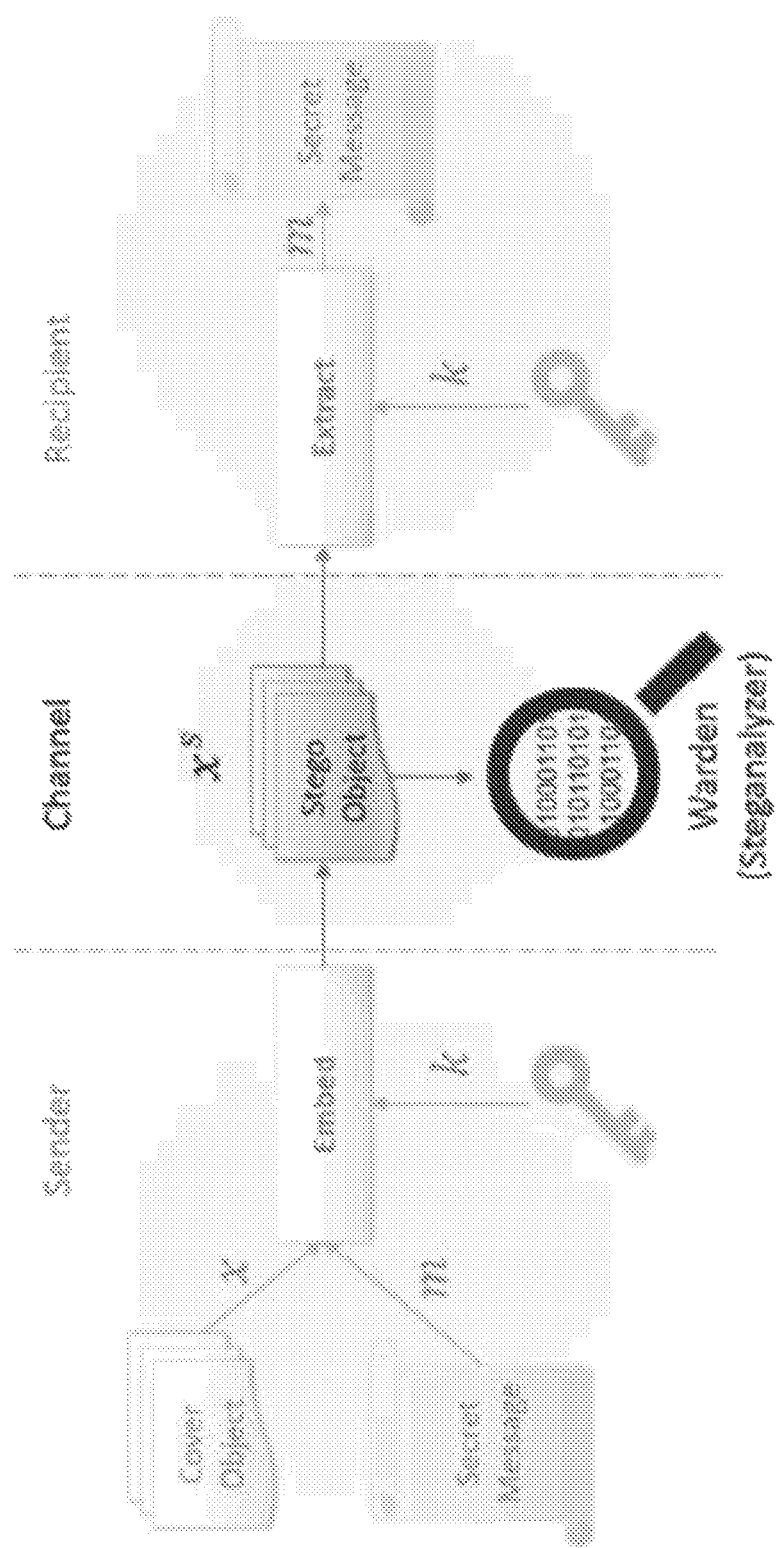
FIG. 6 is a schematic diagram of a steganalysis system according to an embodiment.

According to an embodiment, a system is configured to automatically detect and estimate hidden messages and communications introduced as steganographic modifications. FIG. 6 shows a context of the application of our staganalyzer system/method. The method is general and does not depend on a detailed knowledge of the steganograhic embedding algorithm and is able to estimate the number of modifications introduced by steganography. The method is compliant with video transmission formats such as MPEG-2, MPEG-4 and H.264. It uses a new concept of morphological features extracted from motion vectors (MVs) of videos.

The system is configured to generate a set of MV maps from a database of videos using a morphomathematical equation to extract statistical properties relating the amount of modifications introduced by steganography. The statistical properties are the number of isolated macro blocks, their second order statistics and the number of homogeneous areas per frame. In this way, a learning map of video taken from the dataset is computed and used a reference map. Given a video it is therefore possible to compute its statistical morphological properties as described above. These features can then be compared against the reference map and decision made as to whether it has an embedded message or not. The likelihood of a hidden message is further supported by the rate of matching while the size of the message can also be estimated by the average number of areas per frame.

The system includes a fully automated software system to assist the law enforcement and security officers to examine automatically the flow and hits of videos exchanged on the Internet to detect abnormal videos that have suspected hidden messages or communications. This will ensure a quick and efficient identification of suspect exchanges and arrest criminals timely.

According to an embodiment, a steganalyzer system has been developed along with an application to make a demonstration of the developed steganalyzer system. This application has been developed in C and C++. This application is decomposed of three parts. The first part is doing some signal processing i.e., read an image or video, extract motion vector, and conversion of data into bits. Followed by steganography, i.e., how to perform steganography on image with known methods and afterword's how to perform steganography on videos. Finally, the last part is the graphical presentation of our application.

For example, this application begins with signal processing i.e., opening a video, and does facial recognition to take a photo which is to be embedded on that video. The application may display a first figure illustrating face detection and a second figure illustrating only face after removing the area around it, which will be embedded on a video. The result after steganography and extraction may be presented in a third picture.

Figure 7:
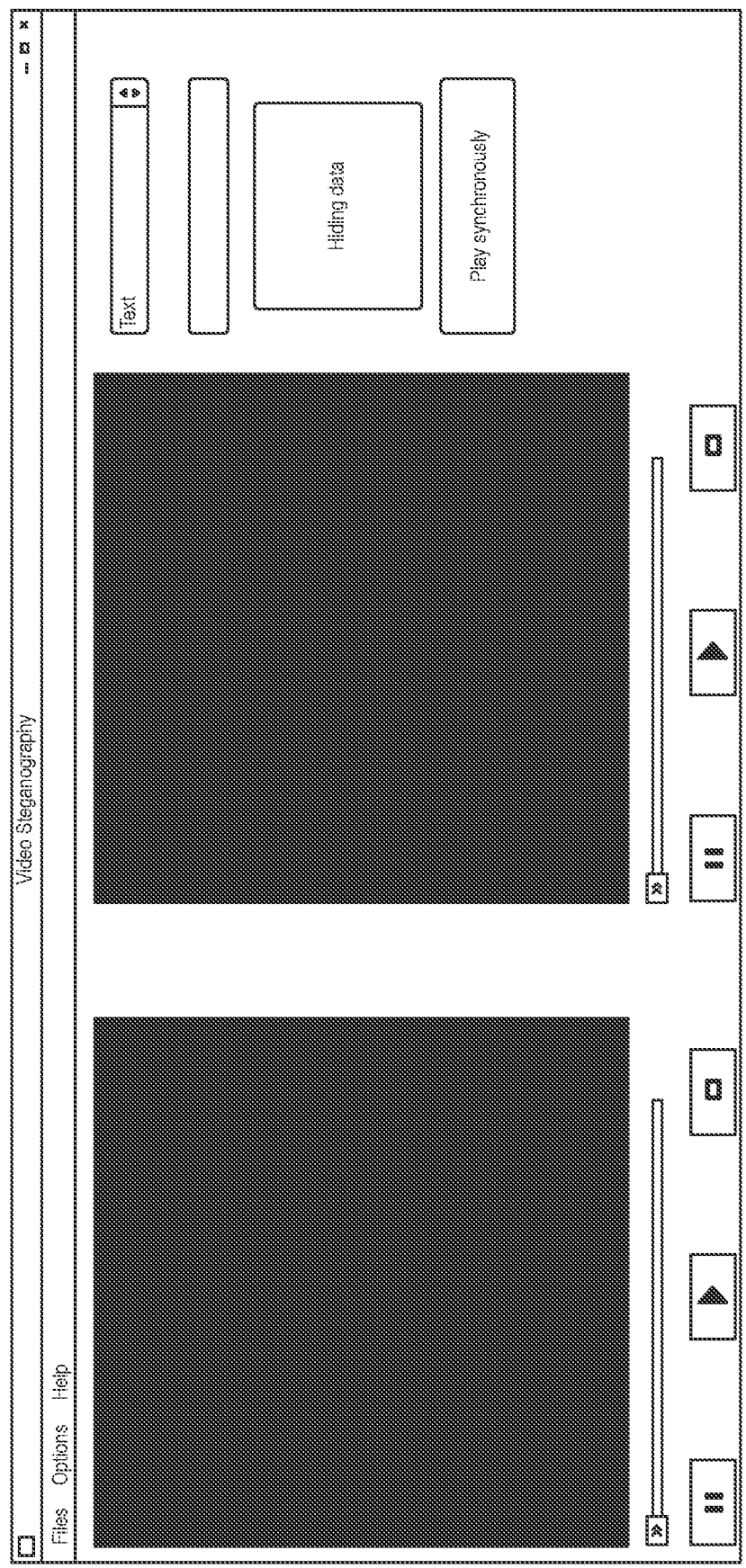
FIG. 7 is an illustration of a graphical application according to an embodiment.
Figure 8:
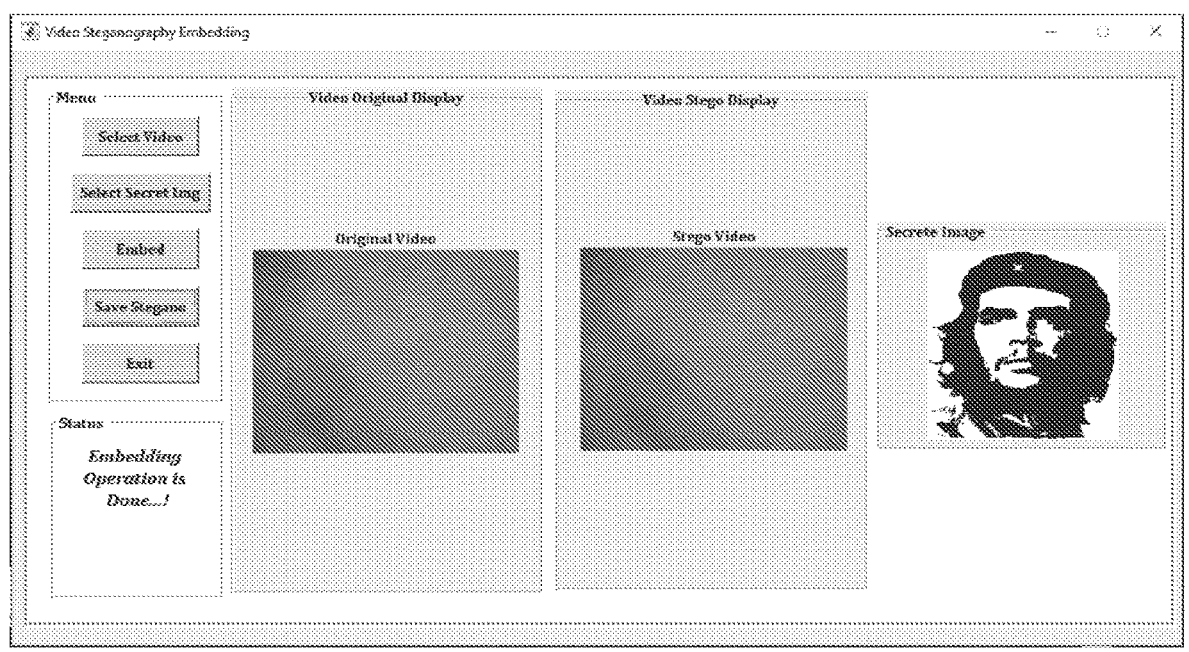
FIG. 8 is an illustration of a graphical application according to an embodiment.
Figure 9:
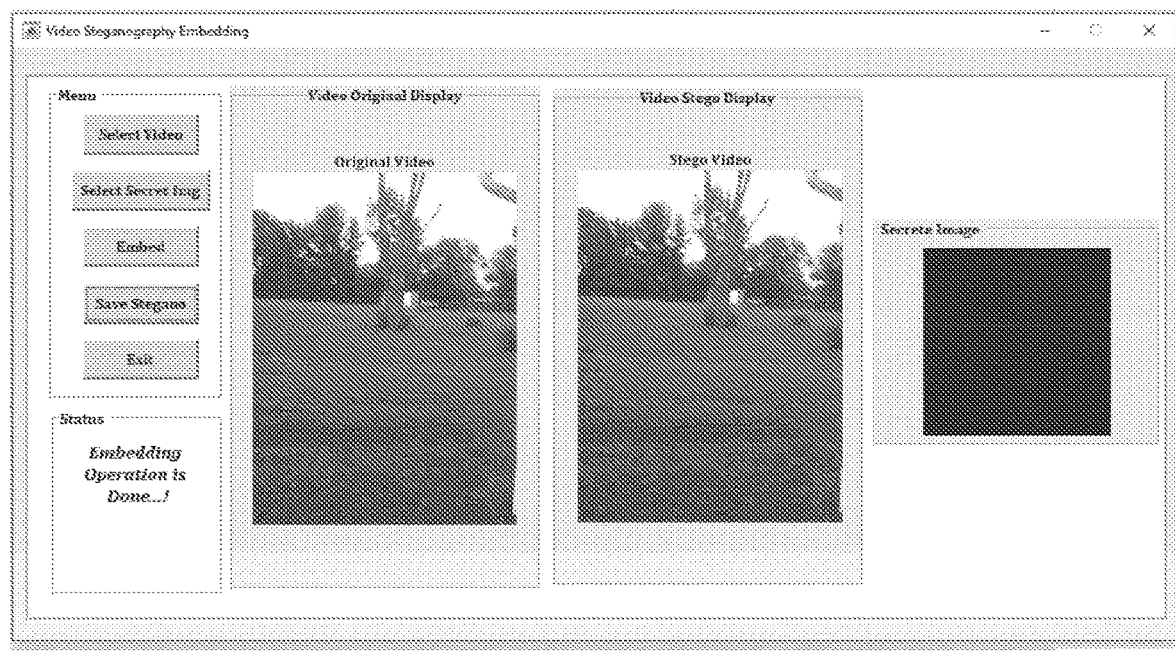
FIG. 9 is an illustration of a graphical application according to another embodiment.
Figure 10:
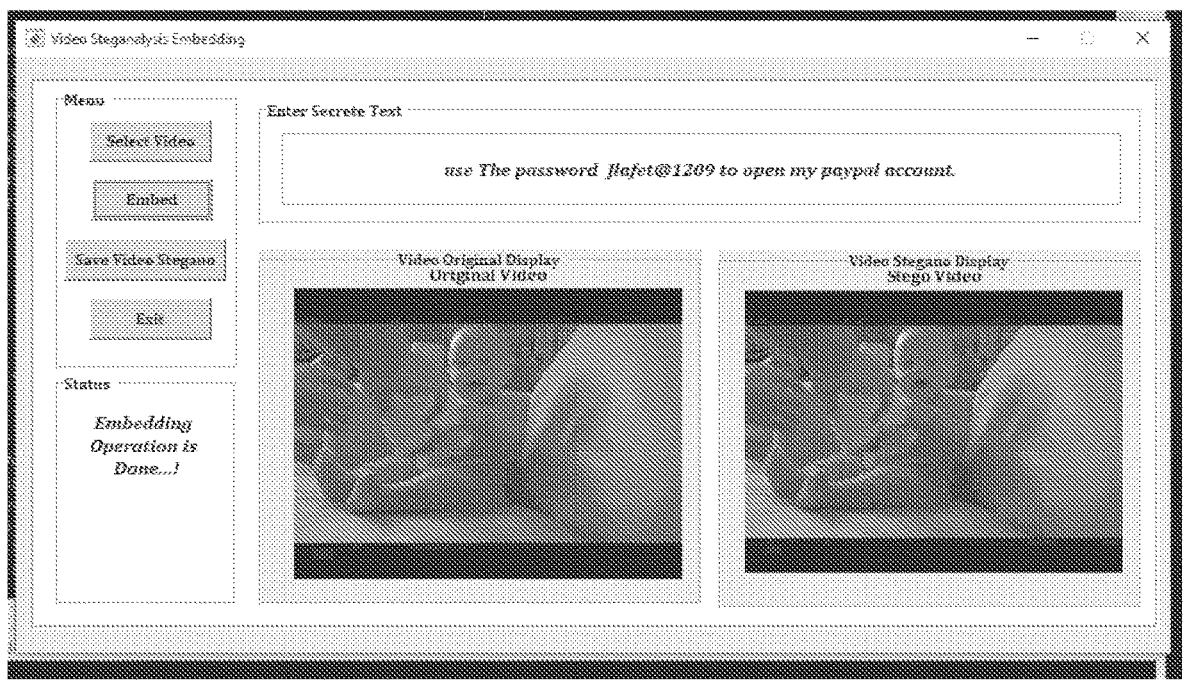
FIG. 10 is an illustration of a graphical application according to an embodiment.
Figure 11:
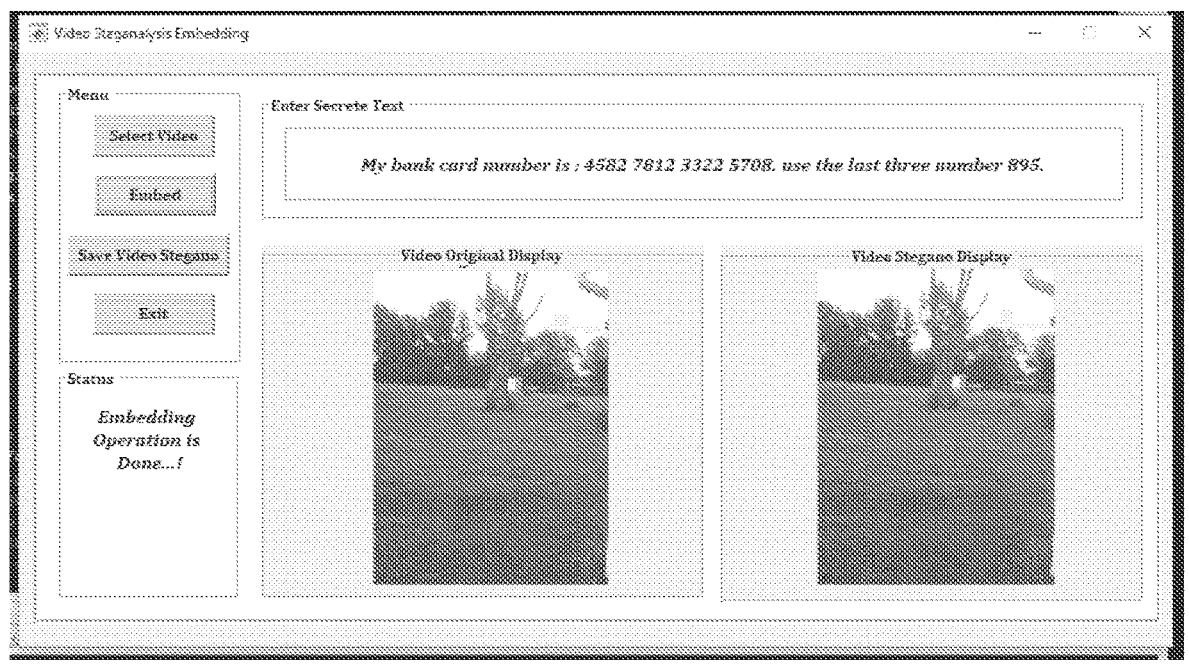
FIG. 11 is an illustration of a graphical application according to another embodiment.
Figure 12:
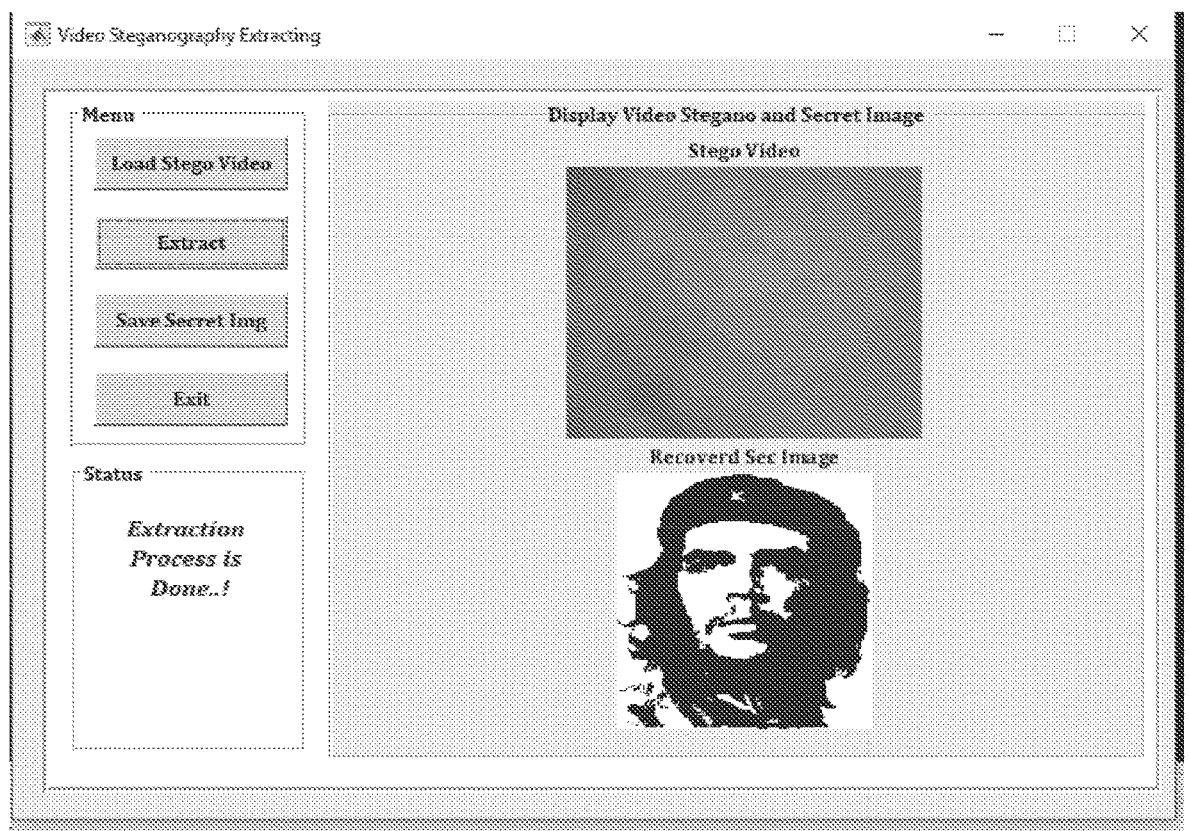
FIG. 12 is an illustration of a graphical application according to an embodiment.
Figure 13:
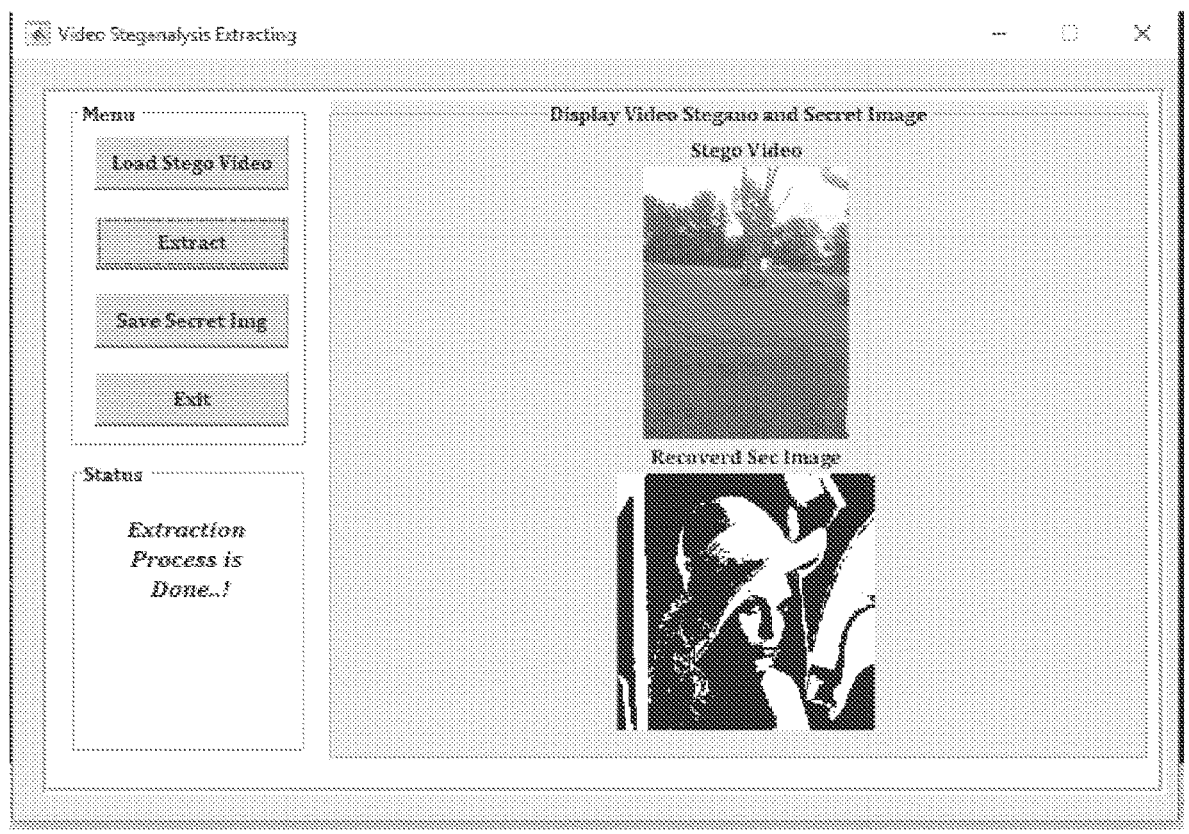
FIG. 13 is an illustration of a graphical application according to another embodiment.
Figure 14:
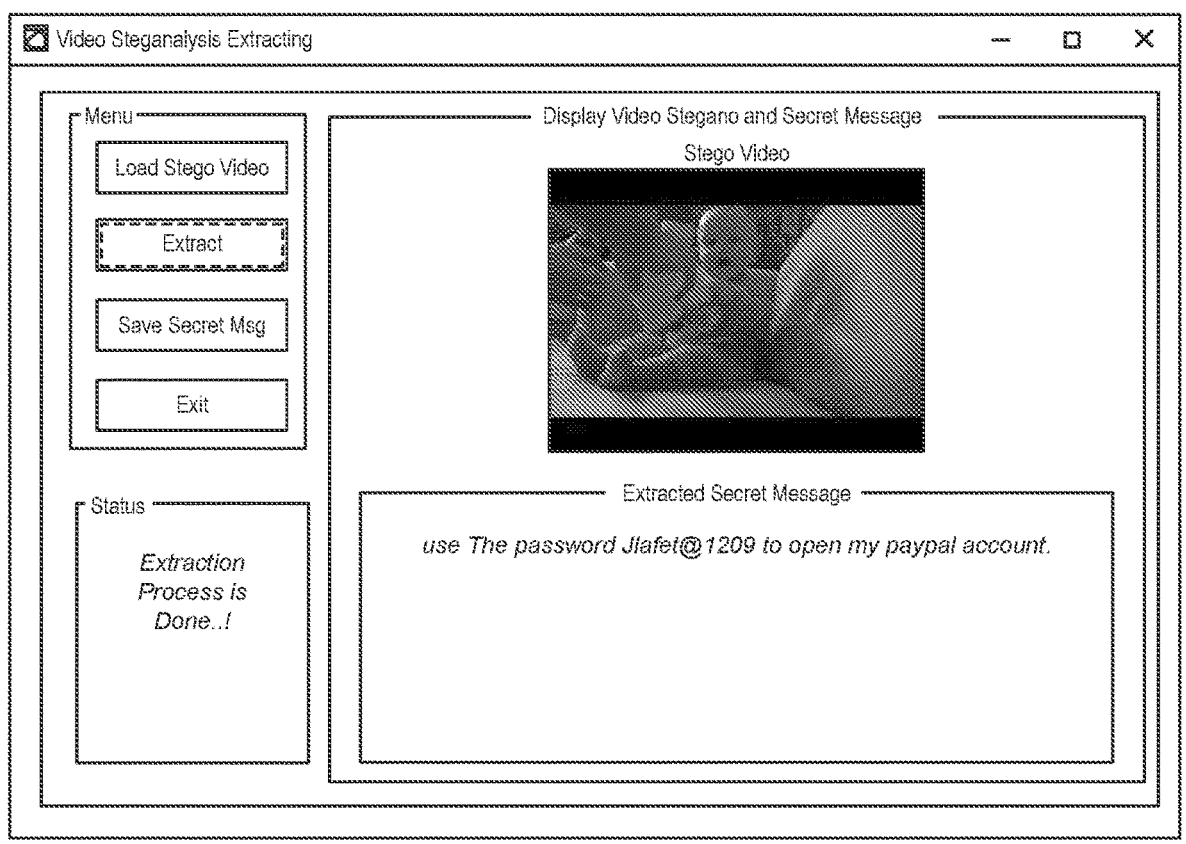
FIG. 14 is an illustration of a graphical application according to another embodiment.
Figure 15:
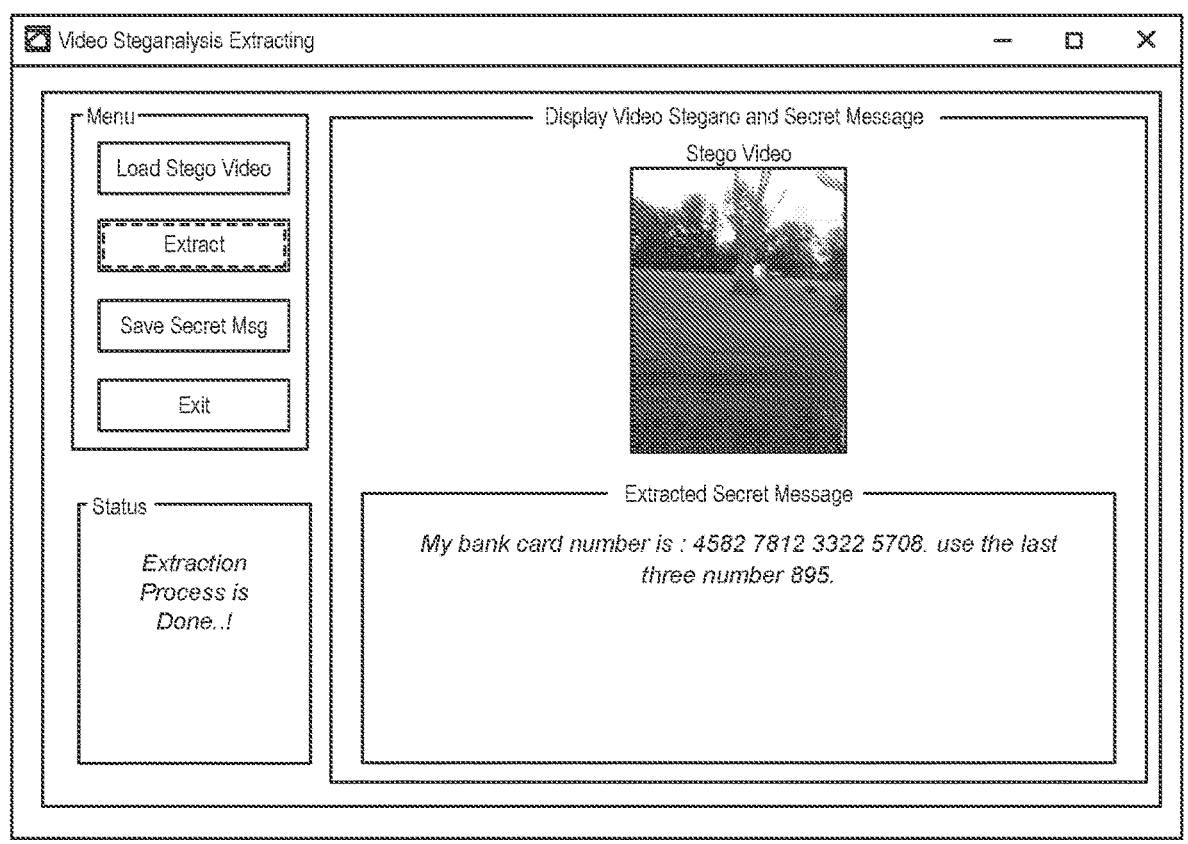
FIG. 15 is an illustration of a graphical application according to an embodiment.

A graphical application is illustrated in FIG. 7 according to an embodiment. The menu buttons allow open a video, text or images. It can extract frames on hard drive too. In the option menu, the user can choose among three different methods: 1. Modification of all motion vector, 2. Irrelevant data, and 3. Relevant data. The default one is irrelevant data.

It allows to choose between four types of data to embed in the combo box: Text (i.e. load a text in a .txt_le), Input (i.e. tap on keyboard your text directly), Image (i.e. loading an image in JPG or PNG formats) or camera (i.e. opening the frontal camera of the computer and take of photo of the face). Clicking on hide data will launch the hiding of data. After that the button hide data will become retrieve data. After extraction, the hidden image will appear and be illustrated in a Figure. The two-black square are here to play videos. The black square on the left side play's the original videos and the one on the right side modifies the original videos. It allows to control the users position inside a video with slide bar and control, playing and pausing with the associated buttons. Moreover, every task is treated separately from each other to allow user to do multiple task at same time i.e., opening a video and a text in the same time or playing two videos together.

FIGS. 8 to 11 illustrate examples of graphical application for video steganography embedding. For example, the user can embed an image or a text message on a selected original video by using the steganographic system or software as described herein, and save the embedded video as stego video.

FIGS. 12 to 15 illustrate examples of graphical application for video steganalysis extracting. For example, the user can load a stego video or a plurality of stego video to the steganographic system or software as described herein, and the hidden secrete message or image will be extracted and displayed in the steganalyzer system or software.

The present disclosure also provides a method including analyzing regularity in motion vectors recorded in a compressed video file, by comparing the standard deviation of the motion vectors with the number of areas assessed to have local correlation in the images. This determines whether those values (i.e. the variation in motion vectors and the number of areas) are closely correlated.

According to an embodiment, a motion vector is associated with each 'macro-block' within the images-localized blocks of similar date. Where there is assessed to be a relatively high number of macro-blocks that are determined to be "isolated" in that they differ substantially from neighbouring blocks (i.e. neighbouring in the spacial domain), when assessed against the number of macro-blocks and the number of areas in the frame, the video is determined to have a high likelihood of including embedded hidden data. A classification of videos containing embedded hidden data can be made using a Support Vector Machine (SVM) algorithm, or other common machine learning algorithms, to make this decision based on the statistical analysis of the compressed video data.

The present disclosure also provides a method having a relatively high reliability for determining which videos contain embedded hidden data, with a relatively low number of false positives.

The present disclosure also provides a system that compares the number of macro-blocks and correlated areas of video frames against the variance or standard deviation of the distribution of motion vectors, to determine whether hidden data is embedded in a video.

One of the technical effects according to an embodiment of the present disclosure is that it provides an improved reliable method for analyzing video data, and that it is significantly computationally efficient compared to the conventional methods. Another technical advantage is that it provides a system that need less manual expert interaction and training prior to use of this system. The embodiments of the present disclosure enable a computationally more efficient, and therefore quicker, process for establishing whether a video contents hidden data. The system according to an embodiment may also perform at a higher success rate and higher efficiency than earlier equivalent systems. It should be noted that the effects described herein are not necessarily to be considered limited, and other suitable properties relating to the present technology may be realized and as further described.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system, comprising:
a display and
a processor,
wherein the processor is configured to:
extract a motion vector map from a transmitted video,
calculate and extract a morphological structure of the motion vector map,
evaluate the morphological structure of the motion vector map, and
determine with a confidence score if the video includes embedded information,
wherein the embedded information refers to information hidden in contents of the video by way of steganography and not observable during displaying the contents of the video, and
wherein the morphological structure includes one or more of a number of isolated motion macro blocks and a number of homogeneous areas per frame.

2. The system according to claim 1 further comprising a memory, wherein the memory is configured to read data of the video.

3. The system according to claim 1, wherein the display is configured to output an outcome of the processed transmitted video indicating whether it contains a hidden information.

4. The system according to claim 1, wherein the processor is configured to perform an analysis of the motion vector and its classification via a support vector machine algorithm.

5. The system according to claim 1, wherein the video is in a compressed format.

6. A method, comprising:
generating a motion vector map from a video,
extracting a morphological feature from the motion vector map,
evaluating the morphological feature of the motion vector map, and
determining if the video includes embedded information,
wherein the embedded information refers to information hidden in contents of the video by way of steganography and not observable during displaying the contents of the video, and
wherein the morphological feature includes one or more of a number of isolated motion macro blocks and a number of homogeneous areas per frame.

7. The method according to claim 6, wherein an outcome of the analysis indicates whether the transmitted compressed video contains a covert message/communication which is shown as output in a display.

8. The method according to claim 6, further comprising performing analysis and classification of motion vectors macroblocks via a support vector machine algorithm.

9. The method according to claim 6, wherein the video is in a compressed format.

\* \* \* \* \*